United States Patent

[11] 3,614,224

[72] Inventor Warren C. Portman
Mahopac, N.Y.
[21] Appl. No. 824,452
[22] Filed May 14, 1969
[45] Patented Oct. 19, 1971
[73] Assignee Columbia Broadcasting System, Inc.
New York, N.Y.

[54] METHODS AND APPARATUS FOR PRODUCING FILM DISC SEGMENTS
4 Claims, 4 Drawing Figs.

[52] U.S. Cl. .......... 355/53, 353/120, 355/86, 355/96
[51] Int. Cl. .......... G03b 27/46
[50] Field of Search .......... 355/47, 53, 86, 95, 96, 104; 350/134; 353/120; 95/18

[56] References Cited
UNITED STATES PATENTS
2,412,761 12/1946 Williams .......... 355/49

*Primary Examiner*—Samuel S. Matthews
*Assistant Examiner*—Kenneth C. Hutchison
*Attorney*—Brumbaugh, Graves, Donohue & Raymond

ABSTRACT: A camera for copying a series of transparencies onto 35-millimeter film in 90° circular arcs as a step in constructing audio-visual cartridges. These cartridges are circular discs having 52 spaced transparencies each arranged on a total of four such strips per cartridge. The projector, transparency, and optics of the apparatus move arcuately with respect to the stationary film segment receiving the images, driven stepwise by a cam, ratchet, and pawl mechanism.

PATENTED OCT 19 1971 3,614,224

INVENTOR.
WARREN C. PORTMAN
BY
Brumbaugh, Graves, Donohue & Raymond
his ATTORNEYS

METHODS AND APPARATUS FOR PRODUCING FILM DISC SEGMENTS

BACKGROUND OF THE INVENTION

This invention relates to cartridges used in audio-visual devices which coordinate the projection of individual picture transparencies with the reproduction of corresponding sound information and, more particularly, to methods and apparatus for producing film disc segments for such cartridges.

An audio-visual device and cartridge therefor are illustrated and described in a copending U.S. Pat. application, entitled "Audio-Visual Apparatus," Ser. No. 630,762, filed Apr. 13, 1967 (now U.S. Pat. No. 3,504,445) and assigned to the assignee of the present invention. Generally, the audio-visual device, which has a teaching mode of operation and a testing mode of operation, utilizes a combination cartridge containing transparencies and a central captive record disc. The cartridge includes 52 circumferentially spaced transparencies which may be separated into quadrants, each quadrant containing 13 transparencies. In the teaching mode of operation, the transparencies are selectively projected onto a screen to the accompaniment of an audio description reproduced from the record disc and, in the test mode of operation, each projected transparency and the accompanying reproduced audio information comprises a test question which is answerable as at least a two-element multiple choice.

The captive record disc is carried by a motor-driven turntable and the transparencies are carried by and secured to a cartridge drive means which is incrementally rotated. For separating the segments of audio information relating to different transparencies, the record disc has recorded thereon subaudible tone signals. The transparent disc also includes selectively spaced depressions formed in its lower surface, each depression being aligned with a particular transparency and corresponding to a correct answer to the question presented to a pupil concerning the transparency.

The marketing potential for such audio-visual devices is, as can be appreciated, great. To realize this potential the devices must be inexpensive to purchase and should require only minimal maintenance. It follows therefore that the cartridges for such devices must also be inexpensive to purchase. To meet this requirement, it is incumbent upon the manufacturers of such cartridges to devise methods and apparatus for inexpensively producing the film quadrants for such cartridges.

SUMMARY OF THE INVENTION

It is therefore an object of the present invention to provide a method and apparatus therefor for producing inexpensively film quadrants for audio-visual cartridges.

This and other objects of the present invention are accomplished by sequentially photographing a selected number of transparencies in a predetermined pattern on a film. To photograph the selected number of transparencies in the predetermined pattern, apparatus is provided wherein the film carried by a camera is sequentially exposed to a plurality of sequentially illuminated color transparencies. A member which is mounted on the camera and movable relative thereto in fixed increments includes a light-transmissive segment for directing the image-carrying light from each illuminated color transparency to different segments of the film as the member is moved.

DESCRIPTION OF THE PREFERRED EMBODIMENT

Figures 1, 3, 4:
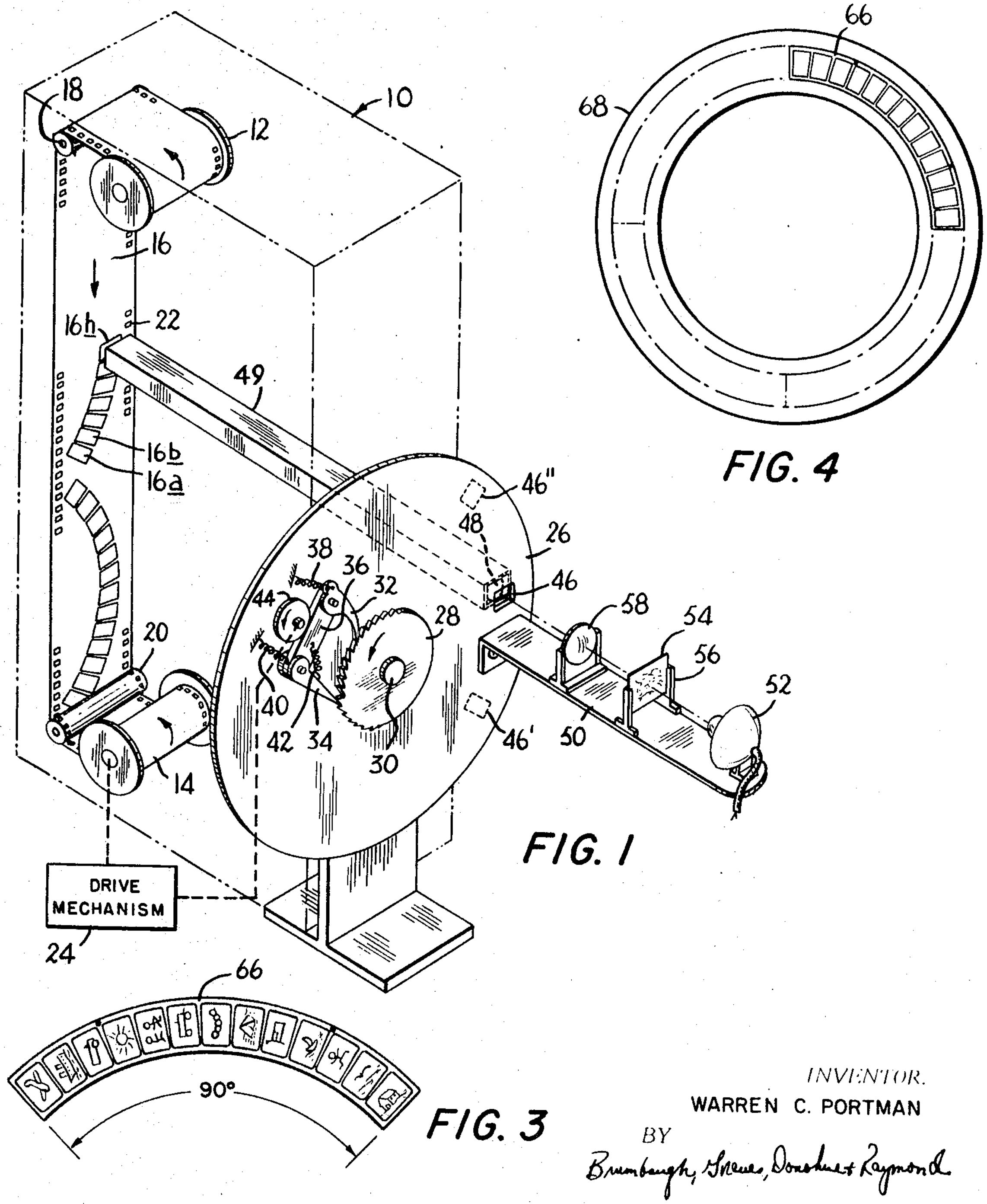
FIG. 1 is a perspective view of an illustrative apparatus for photographing a plurality of color transparencies in a predetermined pattern on a film arranged according to the present invention.
FIG. 3 is a plan view in actual size illustrating a punched film quadrant adapted for mounting in an audio-visual cartridge.
FIG. 4 is a top plan view illustrating punched film quadrant mounted circumferentially in the base member of an audio-visual cartridge.

In the illustrative embodiment of apparatus for photographing a plurality of color transparencies in a predetermined pattern on a film arranged according to the present invention, as shown in FIG. 1, there is provided a camera 10. The camera 10 includes a film supply roller 12 mounted adjacent the top wall thereof and a film takeup roller 14 mounted adjacent the bottom wall thereof. A 35-millimeter filmstrip 16, which is initially wound around the roller 12, is guided in its travel between the two rollers 12 and 14 by a pair of spaced guide sprockets 18 and 20. The guide sprockets 18 and 20 are provided with peripheral pins along their respective edges for engaging the registration apertures 22 of the filmstrip 16.

The operation of the supply and takeup rollers 12 and 14, respectively, is controlled by a drive mechanism 24 which intermittently drives both rollers in counterclockwise directions to cause the passage of a selected amount of film between the two rollers each time the drive mechanism is actuated. For example, in an embodiment of the invention which has been operated with success, the drive mechanism 24 is operative to displace the film 16 in the camera 10 by a distance equal to the distance spanned by 20 of the registration apertures 22. It should be understood that the rollers 12 and 14 may be rotated manually to accomplish the selective displacement of the filmstrip 16. As will be explained in detail hereinbelow, the drive mechanism 24 is actuated after 13 transparencies have been recorded in an arc on the filmstrip 16, the longitudinal distance along the filmstrip 16 between the first and 13th transparencies being slightly less than the distance spanned by 20 adjacent apertures.

The camera 10 is further provided with a rotatable and generally circular faceplate 26. The drive mechanism for the faceplate 26 includes a ratchet 28 which is secured to the faceplate 26 via a circular pin member 30. Engaging the teeth of the ratchet 28 are a pair of pawls 32 and 34 which are interconnected by a support arm 36. A spring 38 urges the pawl 32 out of engagement with the teeth of the ratchet 28 while a spring 40 similarly urges the pawl 34 out of engagement with the ratchet 32. The pawl 34 is also biased toward the support arm 36 by a spring 42. In order to drive the ratchet 28 in a counterclockwise direction, a cam roller 44 is provided which is driven by the drive mechanism 24.

The drive mechanism 24 is operative to selectively pulse the cam roller 44 and cause the roller 44 to rotate in a counterclockwise direction. When rotated, the cam roller 44 exerts a moment against the support arm 36 such that the pawl 34 is driven downwardly against the ratchet 28 to cause the ratchet 28 to rotate, which in turn, implements the momentary release of the pawl 32 from engagement with the ratchet 28. The pawl 32 will then slide into engagement with the immediately adjacent and next highest tooth of the ratchet 28. After the pawl 32 has moved into engagement with the next highest tooth of the ratchet 28, the pawl 34 will similarly slide into engagement with the immediately adjacent and next highest tooth of the ratchet 28.

Mounted near the periphery of the faceplate 26 is a generally rectangular light-transmissive segment or aperture 46 which is reduced in size with respect to the filmstrip 16. Mounted between the aperture 46 and the filmstrip 16 and secured to the faceplate 26 is a conventional lens-shutter arrangement 48. As is understood, the lens focuses the light admitted by the aperture 48 through light conduit 49 onto a portion of the filmstrip 16 while the shutter controls the exposure of the filmstrip 16. It may be noted that as the faceplate 26 is incrementally rotated, the light admitted by the aperture 46 will be focused onto the filmstrip 16 in an arcuate pattern.

Bolted to the faceplate 26 is a slide projector 50, which includes a light source 52 for illuminating a color transparency 54 held captive by a transparency holder 56. The image-carrying light from the transparency 54 is directed by a lens 58 through the aperture 46. While the slide projector 50 is shown as including only the holder 56 into which slides are manually inserted and removed, it should be understood that an automatic slide projector which sequentially interposes different slide transparencies in the path of the light from the light source 52 may be utilized in the present invention.

In operation, an unexposed 35-millimeter filmstrip 16 is mounted on the supply and takeup rollers 12 and 14, respectively, with the registration apertures 22 of the film being engaged by the pins of the guide sprockets 20 and 22. The pawls 32 and 34 are then manually removed from engagement with the teeth of the ratchet 28 and the faceplate 26 rotated in a clockwise direction until the aperture 46 is located at the position indicated by the dashed lines 46' or at an angle of approximately 135°. The pawls 32 and 34 are then released to return them to their engaging positions with the teeth of the ratchet 28. A slide transparency 54 is then inserted into the holder 56 of the projector 50 and the shutter in the lens-shutter arrangement 48 is actuated. Actuation of the shutter exposes the film segment **16*a* to the image-carrying light of the illuminated transparency 54**.

Thereafter, the drive mechanism 24 is actuated to pulse the cam roller 44 which causes the ratchet 28 and, accordingly, the face plate 26 to rotate an incremental distance. There is an approximate 7° displacement of the aperture 46, i.e., from 135° to 128°. A second transparency 54 is then inserted into the holder 56, the shutter of the lens-shutter arrangement actuated and a second segment **16*b* is recorded on the filmstrip 16. The above procedure continues until 13 color transparencies (16*a*–16*n*) have been recorded on the film strip 16. After recording the 13 transparencies 16*a*–16*n*, the aperture 46 is located at the position indicated by the dashed lines 46'' or at the approximate angle of 45°. The aperture 46 will have moved through an arc of 90° and, correspondingly the transparencies will have been recorded in a 90° arc on the filmstrip 16**.

Thereupon, the drive mechanism 24 is actuated to operate the rollers 12 and 14 to cause the downward vertical displacement of the filmstrip 16 a distance equal to the distance spanned by 20 adjacent apertures of the filmstrip 16 such that an unexposed segment of the filmstrip 16 is placed in a position for recording. The pawls 32 and 34 are again manually removed from engagement with the teeth of the ratchet 28 and the faceplate 26 rotated in a clockwise direction until the aperture 46 is located at the position indicated by the dashed lines 46'. Thereafter, 13 different color transparencies are recorded in a 90° arc on the filmstrip 16 in the above-described manner. Following the recordation of those 13 color transparencies, an additional 26 transparencies are recorded on the filmstrip 16. It can be seen, therefore, that over a length of filmstrip 16 spanning 80 adjacent apertures 22, four groups of transparencies will have been recorded on the filmstrip 16, each group comprising 13 color transparencies recorded in a 90° arc. It may be noted that the groups of transparencies, if placed end-to-end, would form a complete circle.

Figure 2:
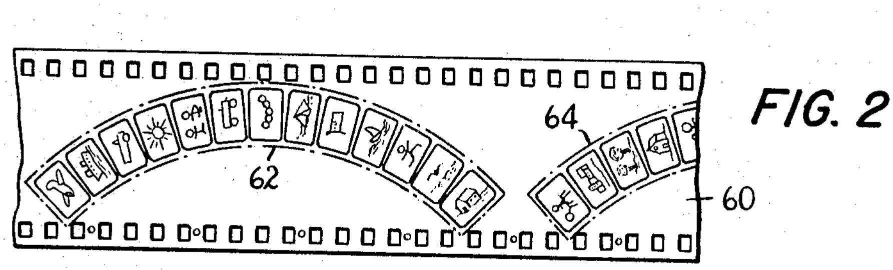
FIG. 2 is a fragmentary plan view in actual size of a 35-millimeter color print containing film quadrants.

Release prints are then made from the negatives in large quantities such as, for example, 3,000- to 10,000-foot quantity rolls. FIG. 2 illustrates in actual size a portion of a release print 60 comprising two groups of transparencies 62 and 64, each group comprising 13 arcuately arranged transparencies. The release prints are then fitted to a punch which punches out film quadrants for circumferential mounting in an audio-visual cartridge. FIG. 3 illustrates such a punched film quadrant 66, in actual size, adapted for mounting in an audio-visual cartridge while in FIG. 4, the film quadrant 66 is shown circumferentially mounted in the base member 68 of an audio-visual cartridge.

Although the invention has been described herein with reference to a specific embodiment, many modifications and variations therein will readily occur to those skilled in the art. All such variations and modifications are included within the intended scope of the invention as defined by the following claims.

I claim:

1. Apparatus for recording a plurality of transparencies in an arcuate pattern on a film carried by a camera comprising, camera means including means for carrying a film along a predetermined path, a circular faceplate mounted on said camera means and rotatable relative thereto in fixed increments in a plane parallel to the path of said film, projector means secured to said faceplate for rotation therewith for sequentially illuminating a plurality of transparencies, light-transmission means including a generally rectangularly shaped aperture formed in said faceplate in fixed optical relationship with the sequentially illuminated transparencies for directing the information carrying light from each illuminated transparency to different segments of the film carried by the camera means as said faceplate is incrementally rotated, and motive means for incrementally rotating said faceplate and said light-transmissive aperture through a predetermined arc.

2. Apparatus according to claim 1 further including means for displacing said film a predetermined distance following the recordation of said plurality of transparencies.

3. Apparatus according to claim 1 wherein the film carried by said camera means is 35-millimeter film and wherein said motive means is operative to incrementally rotate said faceplate through an arc of 90° in steps of approximately 7°.

4. Apparatus according to claim 3 wherein said motive means includes means for moving said film along said path a selected distance following the recordation of said plurality of transparencies to situate an unexposed portion of the film to the image-carrying light of another plurality of sequentially illuminated transparencies.